(12) United States Patent
Sato et al.

(10) Patent No.: US 10,985,586 B2
(45) Date of Patent: Apr. 20, 2021

(54) ELECTRIC POWER SUPPLY SYSTEM OF ELECTRICAL VEHICLE

(71) Applicant: SUBARU CORPORATION, Tokyo (JP)

(72) Inventors: Yutaka Sato, Tokyo (JP); Yoshiyasu Kobayashi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 315 days.

(21) Appl. No.: 16/165,762

(22) Filed: Oct. 19, 2018

(65) Prior Publication Data
US 2019/0190294 A1 Jun. 20, 2019

(30) Foreign Application Priority Data
Dec. 20, 2017 (JP) .............................. JP2017-243562

(51) Int. Cl.
*B60L 1/00* (2006.01)
*B60L 3/00* (2019.01)
(Continued)

(52) U.S. Cl.
CPC ............ *H02J 7/0068* (2013.01); *B60L 50/51* (2019.02); *B60L 58/12* (2019.02); *H02J 1/108* (2013.01);
(Continued)

(58) Field of Classification Search
CPC ...... H02J 7/0068; H02J 1/108; H02J 2207/10; H02J 2310/48; B60L 58/12; B60L 50/51; B60L 2210/10; B60L 2210/40
See application file for complete search history.

(56) References Cited

U.S. PATENT DOCUMENTS

2009/0152953 A1* 6/2009 Dong ................ H01M 8/04574
307/80
2010/0289335 A1* 11/2010 Togare ..................... H02J 1/10
307/65
(Continued)

FOREIGN PATENT DOCUMENTS

JP 2011-041425 A 2/2011
JP 5010288 B2 8/2012
(Continued)

OTHER PUBLICATIONS

Japanese Notice of Reasons for Refusal issued in corresponding Japanese Patent Application No. 2017-243562, dated Feb. 4, 2020, with English translation.
(Continued)

*Primary Examiner* — Rexford N Barnie
*Assistant Examiner* — Rasem Mourad
(74) *Attorney, Agent, or Firm* — McDermott Will & Emery LLP (57) ABSTRACT

An electric power supply system of an electrical vehicle includes a first battery, a battery controller managing the first battery, a second battery supplying second power having a voltage lower than a voltage of the first power, and a control electric power supply management device including a joining line that is able to draw a current from each of a first and a second power supply lines. The control electric power supply management device transmits, depending on a magnitude in voltage level between first and second voltages, one of the first and second powers to the battery controller from one of the first and second power supply lines via the joining line. The first and second voltages are respectively applied to the joining line from the first and second power supply lines when the currents are to be drawn from the first and second power supply lines, respectively.

16 Claims, 6 Drawing Sheets

(51) Int. Cl.
- *H02J 7/00* (2006.01)
- *B60L 50/51* (2019.01)
- *B60L 58/12* (2019.01)
- *H02J 1/10* (2006.01)

(52) U.S. Cl.
CPC ....... *B60L 2210/10* (2013.01); *B60L 2210/40* (2013.01); *H02J 2207/10* (2020.01)

(56) References Cited

U.S. PATENT DOCUMENTS

2016/0179176 A1* 6/2016 Kohara ................. G06F 1/3275
 713/322
2017/0101029 A1 4/2017 Kawano et al.

FOREIGN PATENT DOCUMENTS

| JP | 2014-150593 A | | 8/2014 | |
| JP | 2014150593 A | * | 8/2014 | ............ H01M 10/44 |
| JP | 2017-073892 A | | 4/2017 | |
| JP | 2018-182829 A | | 11/2018 | |
| JP | 2018182829 A | * | 11/2018 | |

OTHER PUBLICATIONS

Japanese Notice of Reasons for Refusal issued in corresponding Japanese Patent Application No. 2017-243562, dated Oct. 8, 2019, with English translation.

* cited by examiner

ELECTRIC POWER SUPPLY SYSTEM OF ELECTRICAL VEHICLE

CROSS-REFERENCE TO RELATED APPLICATIONS

The present application claims priority from Japanese Patent Application No. 2017-243562 filed on Dec. 20, 2017, the entire contents of which are hereby incorporated by reference.

BACKGROUND

The technology relates to an electric power supply system of an electrical vehicle.

In general, an electrical vehicle such as an electric vehicle (EV) or a hybrid electric vehicle (HEV) includes a high-voltage battery and a low-voltage battery. The high-voltage battery supplies electric power to a traveling motor, while the low-voltage battery supplies electric power to a control system of the electrical vehicle. The low-voltage battery also supplies the electric power to devices such as accessories of the electrical vehicle or auxiliary devices for an engine. The above-described electrical vehicle further includes a battery electronic control unit (battery ECU). The battery ECU manages charge and discharge of the high-voltage battery. The battery ECU monitors a state of the high-voltage battery. Non-limiting examples of the state of the high-voltage battery may include a voltage, temperature, a state of charge (SOC), and a state of health (SOH). The battery ECU provides information relating to the state of the high-voltage battery to a vehicle controller. The information relating to the state of the high-voltage battery includes, for example, information as to whether the high-voltage battery is chargeable or not, or information as to whether the high-voltage battery is dischargeable or not.

A control system of the electrical vehicle including the battery ECU receives electric power from the low-voltage battery for its operation. However, such a configuration may cause a situation that, when a remaining amount of the electric power charged in the low-voltage battery is reduced, and thereby the electric power is no longer supplied to the control system of the electrical vehicle, the electrical vehicle is caused to stop its system even when electric power still remains in the high-voltage battery.

In order to overcome such a situation, Japanese Patent No. 5010288 describes, in paragraph 0018, a technique of avoiding electric power depletion in the low-voltage battery during execution of a failsafe control in a hybrid vehicle. In this technique, when a hybrid control unit determines that an output voltage of the low-voltage battery is lower than a predetermined voltage lower limit value, the hybrid control unit causes a converter to be switched to be in an operation state, to thereby execute an emergency control that performs charging from a high-voltage battery to the low-voltage battery.

SUMMARY

An aspect of the technology provides an electric power supply system of an electrical vehicle that includes: a first battery configured to supply first electric power to a traveling motor; a battery controller configured to manage charge and discharge of the first battery; a second battery configured to supply second electric power having a voltage lower than a voltage of the first electric power; and a control electric power supply management device including a joining line that is able to draw an electric current from a first electric power supply line and an electric current from a second electric power supply line, in which the first electric power is transmitted through the first electric power supply line, and the second electric power is transmitted through the second electric power supply line. The control electric power supply management device is configured to transmit, depending on a magnitude in voltage level between a first voltage and a second voltage, one of the first electric power and the second electric power to the battery controller from one of the first electric power supply line and the second electric power supply line via the joining line, in which the first voltage is applied to the joining line from the first electric power supply line when the electric current is to be drawn from the first electric power supply line, and the second voltage is applied to the joining line from the second electric power supply line when the electric current is to be drawn from the second electric power supply line.

DETAILED DESCRIPTION

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

A high-voltage battery stores a large amount of energy, and thus requires strict handling. For example, overcharge and overdischarge are prohibited or should be avoided. Maintenance of the high-voltage battery requires extremely high reliability accordingly. Any circumstance in which a battery ECU is stopped during operation of an electrical vehicle is required to be avoided even in any possible contingency.

According to the technique described in Japanese Patent No. 5010288, when a voltage of a low-voltage battery is gradually lowered, a hybrid control unit is able to detect the lowering of the voltage and control charge of the low-voltage battery accordingly. Therefore, adopting such a technique makes it possible to avoid a circumstance in which electric power of the low-voltage battery is depleted and the battery ECU is stopped accordingly.

However, when the voltage of the low-voltage battery is lowered suddenly, or when electric power supply of the low-voltage battery is suddenly stopped due to any reason such as an abnormality, avoiding the stop of the battery ECU is still difficult even when such a technique is adopted. One reason is that, in such a case, the hybrid control unit itself is stopped due to an electric power shortage before the hybrid control unit detects that the voltage of the low-voltage battery is lowered. Another reason is that, for devices such as a converter that generates a charging voltage or a relay switch that switches a supply path of electric power, it becomes difficult to perform normal operation due to the electric power shortage.

In contrast, in order to avoid the stop of the battery ECU even when an abnormality occurs in a low-voltage battery, one method may be considered in which a backup low-voltage battery and a backup battery ECU are provided to handle the abnormality. However, this configuration may cause various situations, including the increase in the number of components of an electrical vehicle, the increase in space for mounting such components of the electrical vehicle, the increase in the weight of the electrical vehicle, and the increase in component costs of the electrical vehicle.

It is desirable to provide an electric power supply system of an electrical vehicle which makes it possible to continue managing charge and discharge of a first battery that supplies electric power for traveling even when an electric power supply performance of a second battery that supplies electric power for a control system of the electrical vehicle is degraded suddenly.

Figure 1:
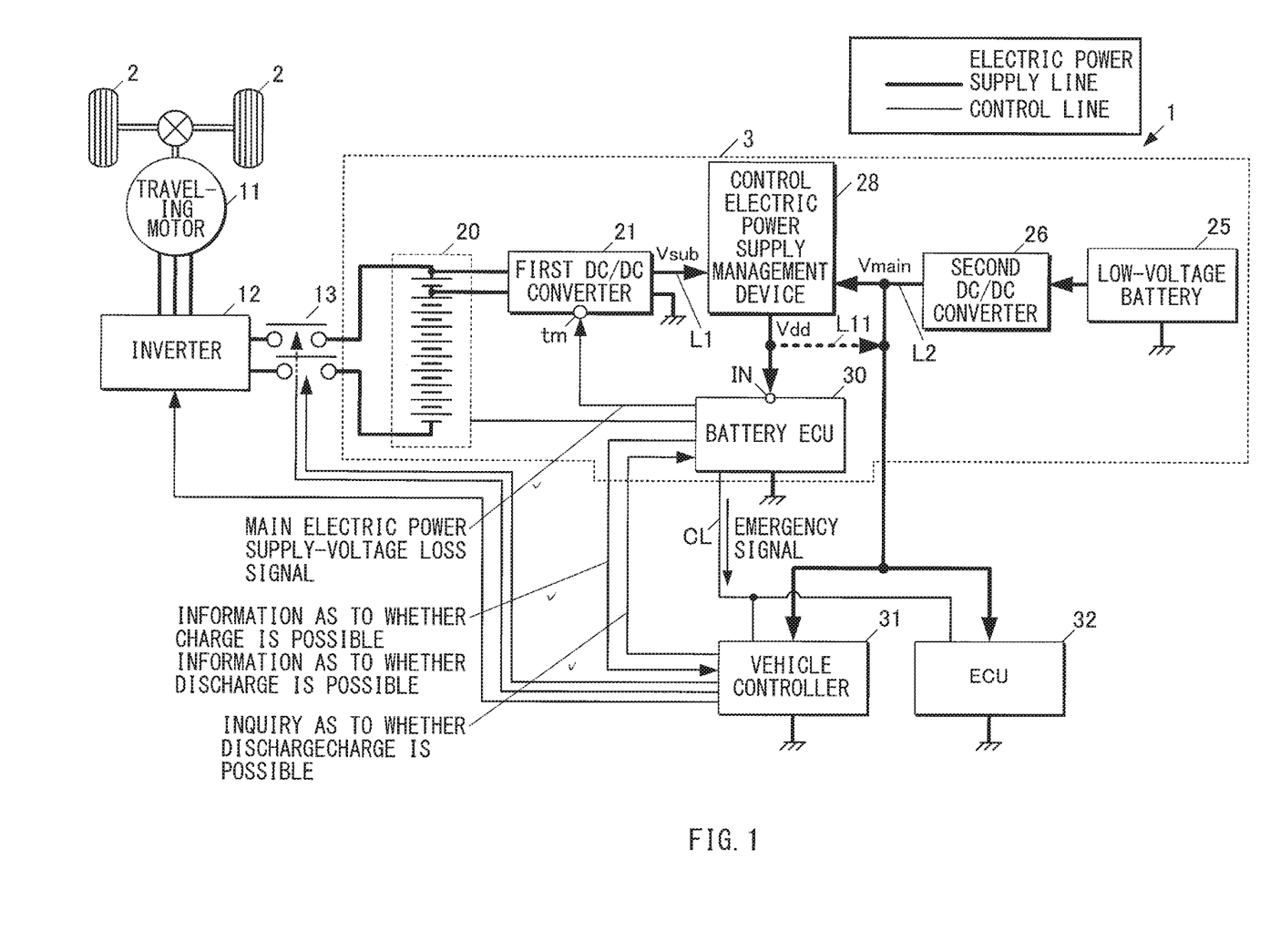
FIG. 1 is a block diagram illustrating a main part of an electrical vehicle provided with an electric power supply system according to one example implementation of the technology.
Figure 2:
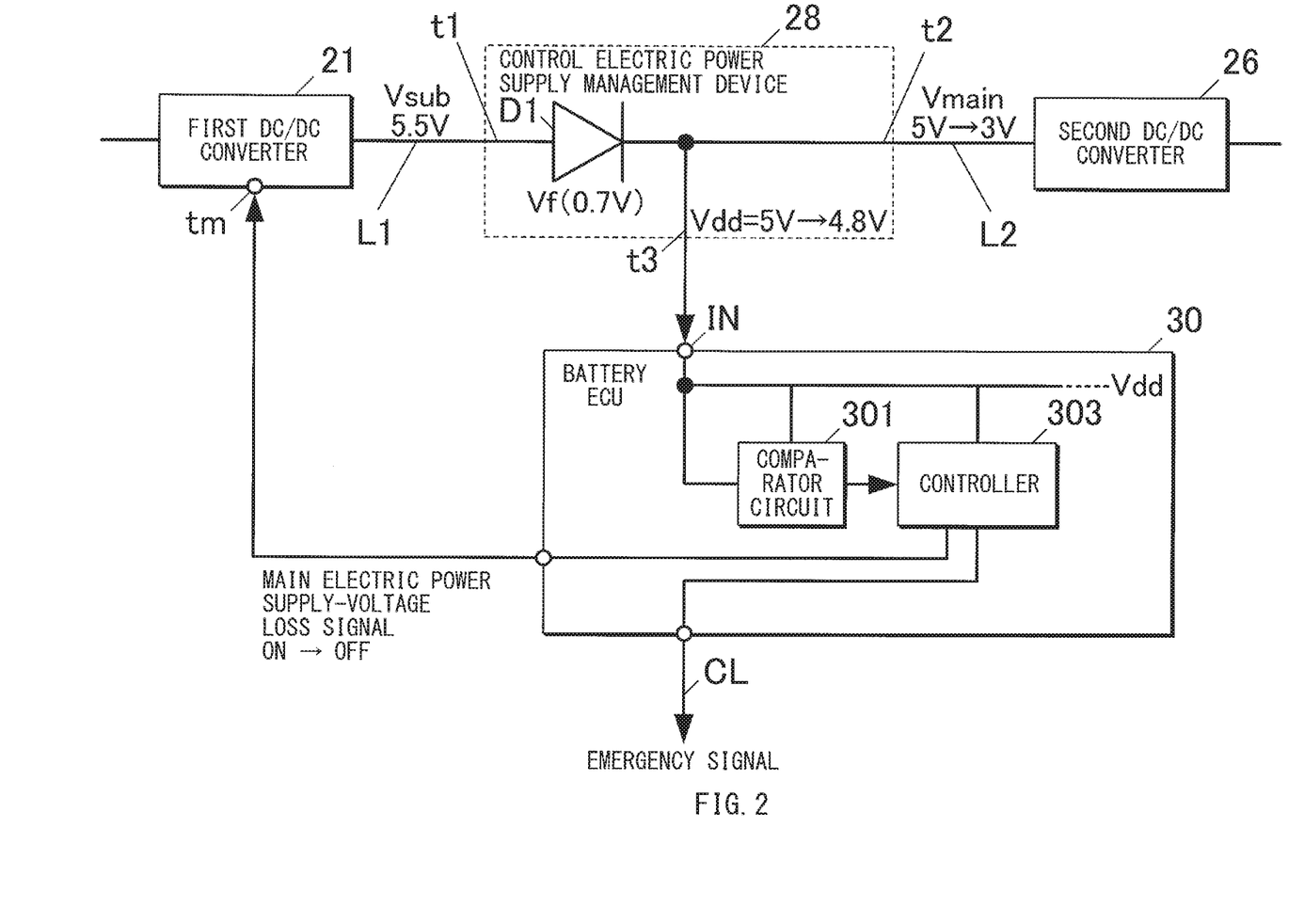
FIG. 2 is a detailed configuration diagram illustrating an example of a control electric power supply management device and its surrounding devices illustrated in FIG. 1.

FIG. 1 is a block diagram illustrating a main part of an electrical vehicle 1 according to an example implementation of the technology. FIG. 2 is a detailed configuration diagram illustrating an example of a control electric power supply management device and its surrounding devices illustrated in FIG. 1.

The electrical vehicle 1 according to an example implementation of the technology may be an electric vehicle, a hybrid electric vehicle, or other types of vehicles. The electrical vehicle 1 may include a traveling motor 11, a high-voltage battery 20, a main relay 13, and an inverter 12. The traveling motor 11 may drive wheels 2. The high-voltage battery 20 may store and supply electric power for traveling. The inverter 12 may drive the traveling motor 11. The electrical vehicle 1 may further include a battery electronic control unit (battery ECU) 30, a vehicle controller 31, various types of ECUs 32, a low-voltage battery 25, a first DC/DC converter 21, a second DC/DC converter 26, and a control electric power supply management device 28. Among these devices, the high-voltage battery 20, the low-voltage battery 25, the first DC/DC converter 21, the second DC/DC converter 26, the control electric power supply management device 28, and the battery ECU 30 may configure the electric power supply system 3. In one implementation, the high-voltage battery 20 may serve as a "first battery". In one implementation, the low-voltage battery 25 may serve as a "second battery". In one implementation, the battery ECU 30 may serve as a "battery controller". In one implementation, the control electric power supply management device 28 may serve as a "control electric power supply management device".

The low-voltage battery 25 may be, for example, a lead-acid battery. The low-voltage battery 25 may supply electric power having a voltage lower than a voltage of the high-voltage battery 20. The low-voltage battery 25 may supply electric power to devices such as the battery ECU 30, the vehicle controller 31, various types of ECUs 32, unillustrated auxiliary devices for an engine, or unillustrated various types of accessories.

The second DC/DC converter 26 may convert the voltage of the low-voltage battery 25 and output, to a second electric power supply line L2, a main electric power supply voltage Vmain for the control system of the electrical vehicle 1. The second DC/DC converter 26 may supply the main electric power supply voltage Vmain to the vehicle controller 31 and the various types of ECUs 32. The second DC/DC converter 26 may also supply the main electric power supply voltage Vmain to the battery ECU 30 via the control electric power supply management device 28. The second DC/DC converter 26 may receive a voltage from the low-voltage battery 25 as an electric power supply for its operation.

The high-voltage battery 20 may be, for example, a large-capacity secondary battery. Non-limiting examples of the large-capacity secondary battery may include a lithium-ion battery or a nickel-hydrogen battery. The high-voltage battery 20 may output a high voltage for traveling. For example, the high-voltage battery 20 may include a set of a plurality of cells. The cells each may output a relatively low voltage.

The first DC/DC converter 21 may convert a voltage of the high-voltage battery 20 and output, to the first electric power supply line L1, a sub electric power supply voltage Vsub for the control system of the electrical vehicle 1. The first DC/DC converter 21 may receive a voltage from a part of the cells in the high-voltage battery 20 without the main relay 13 interposed between the first DC/DC converter 21 and the high-voltage battery 20. Thereafter, the first DC/DC converter 21 may output the converted sub electric power supply voltage Vsub to the control electric power supply management device 28. The first DC/DC converter 21 may receive a voltage from the high-voltage battery 20 as an electric power supply for its operation.

Further, in an example implementation, the first DC/DC converter 21 may be able to switch load modes between a low-load mode and a high-load mode by means of switching voltage conversion systems. The low-load mode may operate with high efficiency. The high-load mode may be able to output a large electric current. The load modes may be switched by changing an input to a mode terminal tm. The low-load mode may be able to suppress electric power consumption of the first DC/DC converter 21 to be significantly low. In contrast, the high-load mode may improve an output performance of the first DC/DC converter 21. The DC/DC converter that is able to switch the load mods is sold by many parts manufacturers and easily available from them.

The vehicle controller 31 may perform control of the driving of the electrical vehicle 1 in accordance with driving operation performed by a driver, for example. The vehicle controller 31 may include a single ECU or a plurality of ECUs that cooperate with one another. The plurality of ECUs 32 may include various types of ECUs. For example, the various types of ECUs may perform various types of control including, for example, control of a display panel, control of a lighting device, and control of an air-conditioner.

The vehicle controller 31 and the ECU 32 may receive electric power through a predetermined electric power supply line. The predetermined electric power supply line may be, for example, a second electric power supply line L2. The vehicle controller 31 and the ECU 32 may be able to communicate with other ECUs such as the battery ECU via a communication line CL, to thereby receive from the battery ECU 30 an emergency signal informing an emergency state. In one implementation, the predetermined electric power supply line L2 may serve as a "second electric power supply line".

The main relay 13 may be so controlled as to be opened and closed by, for example, the vehicle controller 31, allowing the high-voltage battery 20 to be disconnected from the control system of the electrical vehicle 1 when the high-voltage battery 20 is not to be used.

The inverter 12 may be controlled by the vehicle controller 31. The inverter 12 may convert the electric power of the high-voltage battery 20 and output the converted electric power to the traveling motor 11. The vehicle controller 31 may so control the inverter 12 as to output required torque from the traveling motor 11. Further, the inverter 12 may be able to receive regenerative electric power from the traveling motor 11 upon braking operation on the electrical vehicle 1. Further, the inverter 12 may be able to convert the regenerative electric power, to thereby output charging electric power to the high-voltage battery 20.

The battery ECU 30 may monitor states of various factors of the high-voltage battery 20 in order for the high-voltage battery 20 to be properly used. Non-limiting examples of the various factors may include a voltage, temperature, an SOC, and an SOH of the high-voltage battery 20. Further, the battery ECU 30 may manage charge and discharge of the high-voltage battery 20 on the basis of a detected condition of the high-voltage battery 20. For example, when driving the traveling motor 11, the vehicle controller 31 may make inquiry to the battery ECU 30 whether discharge that causes the traveling motor 11 to generate a required torque is possible. Thereafter, the battery ECU 30 may determine whether the discharge is possible on the basis of a state of the high-voltage battery 20, and return to the vehicle controller 31 information as to whether discharge is possible. Thereafter, when the discharge is possible, the vehicle controller 31 may control the inverter 12 to output the electric power of the high-voltage battery 20 to the traveling motor 11. In contrast, when the discharge is not possible, the vehicle controller 31 may control the output of the inverter 12 to be stopped or reduced, to thereby prevent or suppress the discharge from the high-voltage battery 20. Further, when causing the regenerative electric power to be acquired from the traveling motor 11 via the inverter 12, the vehicle controller 31 may make inquiry to the battery ECU 30 whether charge of the high-voltage battery 20 with use of the regenerative electric power is possible. Thereafter, the battery ECU 30 may determine whether the charge is possible on the basis of the state of the high-voltage battery 20, and return to the vehicle controller 31 information whether charge is possible. Thereafter, when the charge is possible, the vehicle controller 31 may cause the regenerative electric power to be acquired and transmit the regenerative electric power to the high-voltage battery 20. In contrast, when the charge is not possible, the vehicle controller 31 may control the inverter 12 to stop causing the regenerative electric power to be acquired and thereby prevent or suppress the charge of the high-voltage battery 20. Such a management of the battery ECU 30 ensures a proper use of the high-voltage battery 20. For example, the management of the battery ECU 30 may include suppressing or preventing overcharge, overdischarge, or abnormal charge and discharge.

Note that the management, performed by the battery ECU 30, of the charge and discharge of the high-voltage battery 20 is not limited to the above-described examples. For example, the battery ECU 30 may monitor the state of the high-voltage battery 20 and output state information of the high-voltage battery 20 to the vehicle controller 31. Thereafter, the vehicle controller 31 may determine whether the charge or the discharge of the high-voltage battery 20 is possible on the basis of the state information.

Referring to FIG. 2, in an example implementation, the battery ECU 30 may further include a comparator circuit 301, a controller 303, and an electric power supply input port IN. The comparator circuit 301 may compare a voltage of the electric power supply input port IN with a predetermined threshold. When a predetermined condition is satisfied on the basis of a result of the comparison at the comparator circuit 301, the controller 303 may output an emergency signal via the communication line CL. In one implementation, the comparator circuit 301 may serve as a "detector". In one implementation, the controller 303 may serve as a "switching processor". Detailed descriptions are given later of operations of these devices.

Further, the battery ECU 30 may include an output line that outputs a main electric power supply-voltage loss signal to the mode terminal tm of the first DC/DC converter 21. The main electric power supply-voltage loss signal may be turned OFF when the main electric power supply voltage Vmain is normally operated. Further, the main electric power supply-voltage loss signal may be turned ON when the main electric power supply voltage Vmain is lost and the sub electric power supply voltage Vsub is inputted. Detailed descriptions are given later of switching processing of the main electric power supply-voltage loss signal.

The control electric power supply management device 28 may receive the main electric power supply voltage Vmain and the sub electric power supply voltage Vsub, and draw an electric current from one of the two voltages depending on a voltage difference between the two voltages, to thereby transmit the electric current to the battery ECU 30. The control electric power supply management device 28 may transmit resulting electric power to the battery ECU 30. In other words, the control electric power supply management device 28 may automatically switch the drawing of the electric current between the main electric power supply voltage Vmain and the sub electric power supply voltage Vsub, depending on a magnitude in voltage level, i.e. the voltage difference between the two voltages, without an operation electric power supply. As illustrated in FIG. 2, the control electric power supply management device 28 may include a first input terminal t1 and a joining line t3 that are coupled to each other via a diode D1. The control electric power supply management device 28 may include a second input terminal t2 and the joining line t3 that are directly coupled to each other. Th first input terminal t1 may be coupled to the first electric power supply line L1 through which electric power from the high-voltage battery 20 is transmitted. The second input terminal t2 may be coupled to the second electric power supply line L2 through which electric power from the low-voltage battery 25 is transmitted. The diode D1 may include an anode coupled to the first input terminal t1, and a cathode coupled to the joining line t3, thereby preventing the electric current from flowing back from the joining line t3 to the first input terminal t1.

When the electric power supply performance of the low-voltage battery 25 is normally exhibited, a voltage difference between the sub electric power supply voltage Vsub and the main electric power supply voltage Vmain, i.e. Vsub−Vmain, may be so set as to become higher than a forward voltage of the diode D1. The forward voltage of the diode D1 may be, for example, a negative voltage value of "−0.7 v". Further, when the sub electric power supply voltage Vsub is outputted to the battery ECU 30 via the diode D1, a voltage value of the sub electric power supply voltage Vsub may be set as a value that satisfies specifications of the electric power supply voltages. For example, the sub electric power supply voltage Vsub may be 5.5 V, and the main electric power supply voltage Vmain may be 5.0 V. On the basis of this setting, a voltage difference between the sub electric power supply voltage Vsub and the main electric power supply voltage Vmain is −0.5 V, and thus, higher than the forward voltage of the diode D1 of −0.7 v. Further, on the basis of this setting, a resulting voltage derived from the sub electric power supply voltage Vsub that is outputted to the battery ECU 30 via the diode D1 is 4.8 V. This voltage value is calculated from 5.5 V−0.7 V. This voltage value satisfies the specifications of the electric power supply voltages.

<Description of Operation>

A description is given next of operation of the electrical vehicle 1. For example, a description is given of operation relating to an electric power supply of the control system of the electrical vehicle 1.

During system operation of the electrical vehicle 1, the first DC/DC converter 21 may be operated to output the sub electric power supply voltage Vsub, and the second DC/DC converter 26 may be operated to output the main electric power supply voltage Vmain. When the low-voltage battery 25 is normally operated, and electric power charged in the low-voltage battery still remains, the main electric power supply voltage Vmain may be kept at a preset voltage value, e.g. 5.0 V. The main electric power supply voltage Vmain may be supplied to the vehicle controller 31 and the ECU 32. Further, the main electric power supply voltage Vmain and the sub electric power supply voltage Vsub may be outputted to the control electric power supply management device 28.

When the main electric power supply voltage Vmain is normally operated, a voltage of the cathode may be higher than a voltage of the anode in the control electric power supply management device 28. This is due to the voltage difference between the sub electric power supply voltage Vsub and the main electric power supply voltage Vmain. Therefore, an electric current may not flow from the first input terminal t1 to the joining line t3. In contrast, the electric current may flow, to the joining line t3, from the second input terminal t2 receiving the main electric power supply voltage Vmain. Thereafter, the main electric power supply voltage Vmain may be supplied to the battery ECU 30. In other words, when the main electric power supply voltage Vmain is normally operated, a voltage applied to the joining line t3 from the first electric power supply line L1 in a case where an electric current is drawn from the first electric power supply line L1 to the joining line t3 may be 4.8 V, while a voltage applied to the joining line t3 from the second electric power supply line L2 in a case where an electric current is drawn from the second electric power supply line L2 to the joining line t3 may be 5.0 V. Therefore, the electric current may be drawn, to the joining line t3, from the second electric power supply line L2 that has the higher voltage than the voltage in the first electric power supply line L1, and electric power may be supplied to the battery ECU 30 accordingly. At this occasion, the second input terminal t2 may be directly coupled to the joining line t3, which prevents unnecessary consumption of electric power in supplying the main electric power supply voltage Vmain.

Further, when the main electric power supply voltage Vmain is normally operated, the main electric power supply-voltage loss signal may be turned OFF. Therefore, the first DC/DC converter 21 generating the sub electric power supply voltage Vsub may be operated in the low-load mode. In addition, the output of the first DC/DC converter 21 may become zero due to the operation of the diode D1, and thus, electric power consumption for outputting the sub electric power supply voltage Vsub may become significantly low. Therefore, large electric power derived from the high-voltage battery 20 is prevented from being consumed in order to generate the sub electric power supply voltage Vsub.

A situation may also be considered in which the main electric power supply voltage Vmain is lowered from 5.0 V to, for example, 3.0 V due to a factor such as lowering of a remaining amount of electric power charged in the low-voltage battery 25 or an abnormality in the low-voltage battery 25. In such a situation, the sub electric power supply voltage Vsub may become dominant depending on the voltage difference between the first input terminal t1 and the second input terminal t2 of the control electric power supply management device 28. Therefore, the electric current may flow from the first input terminal t1 to the joining line t3 via the diode D1. Thereafter, the sub electric power supply voltage Vsub may be lowered by the forward voltage of the diode D1, and supplied to the battery ECU 30. In other words, upon such an abnormality, the voltage applied to the joining line t3 from the first electric power supply line L1 in a case where the electric current is drawn from the first electric power supply line L1 to the joining line t3 may be 4.8 V, while the voltage applied to the joining line t3 from the second electric power supply line L2 in a case where the electric current is drawn from the second electric power supply line L2 to the joining line t3 may be 3.0 V. Therefore, the electric current may be drawn, to the joining line t3, from the first electric power supply line L1 having the higher voltage than the voltage in the second electric power supply line L2, and electric power may be supplied to the battery ECU 30 accordingly. This may cause an electric power supply voltage Vdd that is to be supplied to the battery ECU 30 to be lowered from 5 V to 4.8 V. However, this voltage may still satisfy the specifications of the electric power supply voltages, which allows the battery ECU 30 to continue performing its operation. At this occasion, the second input terminal t2 may be directly coupled to the joining line t3, and thus, the sub electric power supply voltage Vsub may also be outputted to the output terminal of the second DC/DC converter 26 via the second input terminal t2. However, the output of the low-voltage battery 25 may be reduced and an output impedance of the second DC/DC converter 26 may become high, to thereby make it possible to suppress the electric current flowing from the output terminal of the second DC/DC converter 26 at a small level.

Figure 3:
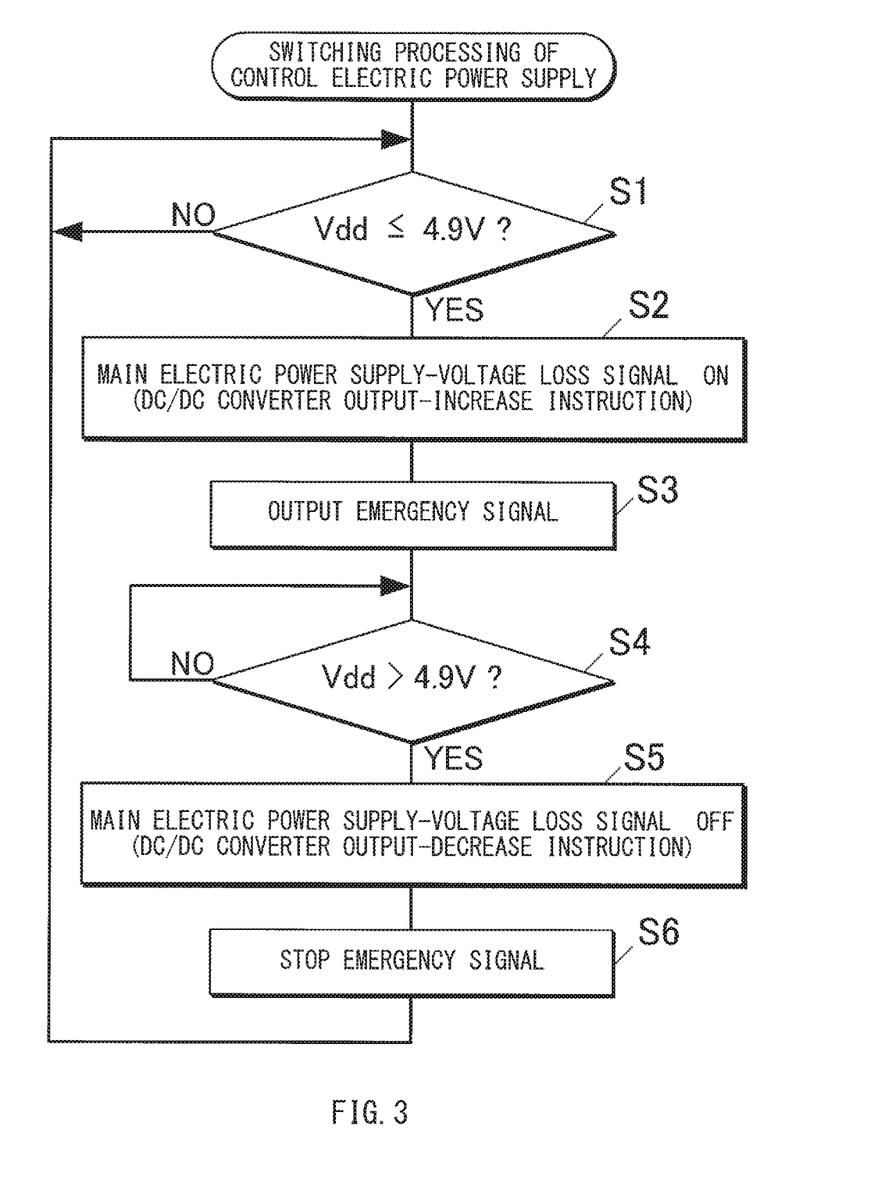
FIG. 3 is a flowchart illustrating an example of a procedure of switching processing of control electric power supply executed by a battery ECU illustrated in FIG. 1.

FIG. 3 is a flowchart illustrating an example of a procedure of switching processing of control electric power supply executed by a battery ECU illustrated in FIG. 1.

During the system operation, the battery ECU 30 may execute the switching processing of the control electric power supply illustrated in FIG. 3. In the switching processing of the control electric power supply, the comparator circuit 301 may constantly compare the electric power supply voltage Vdd with a threshold, in step S1. The threshold may be, for example, 4.9 V. In step S1, when the electric power supply voltage Vdd is lowered, for example, from 5 V to 4.8 V, the comparator circuit 301 may detect this lowering (YES in step S1). Thereafter, in step S2, the controller 303 may turn ON the main electric power supply-voltage loss signal on the basis of a detection result of the voltage lowering. This may cause the first DC/DC converter 21 to operate in the high-load mode, to thereby allow for the output of a relatively large electric current. In one implementation, the battery ECU 30 that performs the process of S2 may serve as a switching processor. In step S3, the controller 303 may further output an emergency signal via the communication line CL on the basis of the detection result of the voltage lowering. Thereafter, the flow may proceed to step S4.

Note that an electric power supply line L11 illustrated in FIG. 1 may be added, in consideration of a possibility that the vehicle controller 31 and the ECU 32 may possibly be inoperable or unstable due to a factor such as electric power loss when the main electric power supply voltage Vmain is lowered. The electric power supply line L11 makes it possible to supply the electric power supply voltage Vdd outputted from the control electric power supply management device 28 to the vehicle controller 31 and the ECU 32 when the main electric power supply voltage Vmain is lowered. Even when this configuration is adopted, the process of step S2 may allow the first DC/DC converter 21 to be switched to the high-load mode, which makes it possible to supply sufficient electric power to the battery ECU 30, the vehicle controller 31, and the ECU 32.

Upon receiving the emergency signal, the vehicle controller 31 and the ECU 32 may execute processing in an emergency. For example, the processing in an emergency may include processing in which the vehicle controller 31 and the ECU 32 enter a failsafe mode to thereby suppress a traveling speed of the electrical vehicle 1 at no greater than a predetermined speed.

Next, a situation may be considered in which the low-voltage battery 25 returns to a normal state and thereby the main electric power supply voltage Vmain returns to a normal value, e.g. 5.0 V, in a situation in which the emergency signal has been outputted. In such a situation, the main electric power supply voltage Vmain may become dominant depending on the voltage difference between the first input terminal t1 and the second input terminal t2 of the control electric power supply management device 28. The electric current may flow from the second input terminal t2 to the joining line t3 accordingly. This allows the main electric power supply voltage Vmain to be supplied to the battery ECU 30. Thereafter, the electric power supply voltage Vdd to be supplied to the battery ECU 30 may be raised from 4.8 V to 5.0 V.

During the output of the emergency signal, the comparator circuit 301 may constantly compare the electric power supply voltage Vdd with a threshold, in step S4. For example, the threshold may be 4.9 V. In step S4, when the electric power supply voltage Vdd is raised, for example, from 4.8 V to 5 V, the comparator circuit 301 may detect this rise (YES in step S4). Thereafter, in step S5, the controller 303 may turn OFF the main electric power supply-voltage loss signal on the basis of a detection result of the voltage rise. This may cause the first DC/DC converter 21 to operate in the low-load mode, to thereby allow for reduction in electric power consumption. In one implementation, the battery ECU 30 that performs the process of step S5 may serve as a switching processor. In step S6, the controller 303 may stop the output of the emergency signal on the basis of the detection result of the voltage rise. Thereafter, the process may return to step S1 in the battery ECU 30.

The electric power supply system 3 may return to a state in a normal situation after the processes of the above-described steps S4 to S6. Thereafter, the main electric power supply voltage Vmain derived from the electric power of the low-voltage battery 25 may be supplied to the battery ECU 30.

In an example implementation as described above, the electric power supply system 3 of the electrical vehicle 1 includes the control electric power supply management device 28. The control electric power supply management device 28 includes the joining line t3 that is able to draw an electric current from the first electric power supply line L1 through which electric power derived from the high-voltage battery 20 is transmitted and an electric current from the second electric power supply line L2 through which electric power derived from the low-voltage battery 25 is transmitted. The control electric power supply management device 28 transmits electric power to the battery ECU 30 via the joining line t3 from one of the first electric power line L1 and the second electric power line L2. Such selective transmission of the electric power performed by the control electric power supply management device 28 depends on a magnitude in voltage level between the voltage applied to the joining line t3 from the first electric power supply line L1 when the electric current is drawn from the first electric power supply line L1 and the voltage applied to the joining line t3 from the second electric power supply L2 when the electric current is drawn from the second electric power supply line L2. Accordingly, when the electric power supply performance of the low-voltage battery 25 is normally exhibited, the electric current is drawn from the second electric power line L2 to the control electric power supply management device 28, to thereby supply the electric power to the battery ECU 30. In contrast, when the electric power supply performance of the low-voltage battery 25 is degraded, and the voltage of the second electric power supply line L2 is lowered accordingly, the electric current is drawn from the first electric power line L1 to the control electric power supply management device 28, to thereby make it possible to supply the electric power to the battery ECU 30. Such switching is performed depending on the magnitude in voltage level. Therefore, even when the electric power supply performance of the low-voltage battery 25 is degraded suddenly, it is possible to acquire a similar working to the working described above. Hence, it is still possible for the battery ECU 30 to continue managing charge and discharge of the high-voltage battery 20.

Further, according to the electric power supply system 3 in an example implementation of the technology, the control electric power supply management device 28 may have the configuration in which the first input terminal t1 is coupled to the joining line t3 via the diode D1 and the second input terminal t2 is directly coupled to the joining line t3. Accordingly, when the main electric power supply voltage Vmain is normally operated, unnecessary consumption of electric power at the control electric power supply management device 28 is prevented or suppressed. Further, when the main electric power supply voltage Vmain is lowered, it is possible to supply the sub electric power supply voltage Vsub to the battery ECU 30 without or less delay.

Further, according to the electric power supply system 3 in an example implementation of the technology, the control electric power supply management device 28 may receive the sub electric power voltage Vsub and the main electric power voltage Vmain. The sub electric power voltage Vsub may be generated, for example, by the first DC/DC converter 21. The main electric power voltage Vmain may be generated, for example, by the second DC/DC converter 26. The high-voltage battery 20 has cells each having a cell voltage, and the cell voltage of the high-voltage battery 20 or the voltage of the low-voltage battery 25 varies due to factors including a remaining amount of charged electric power. However, it is still possible to output extremely stable voltages from the first DC/DC converter 21 and the second DC/DC converter 26. Therefore, the above-described configuration makes it possible to stably achieve the switching, based on a magnitude in voltage between two voltages, between the lines each for drawing the electric current without influence from a variation of a voltage in the cell voltage of the high-voltage battery 20 or in the voltage of the low-voltage battery 25. This switching is enabled on the basis of the voltage difference of the two voltages.

Further, the electric power supply system 3 in an example implementation of the technology may switch the output performance of the first DC/DC converter 21. Further, the battery ECU 30 may detect an input from the sub electric power supply voltage Vsub, to thereby switch the output performance of the first DC/DC converter 21 on the basis of the main electric power supply-voltage loss signal. This makes it possible to make extremely smaller electric power consumption necessary for outputting the sub electric power supply voltage Vsub, when the main electric power supply voltage Vmain is normally operated. Further, this also makes it possible to supply the sub electric power supply voltage Vsub in order to handle a large load, when the main electric power supply voltage Vmain is lowered.

Modification Example 1

Figure 4:
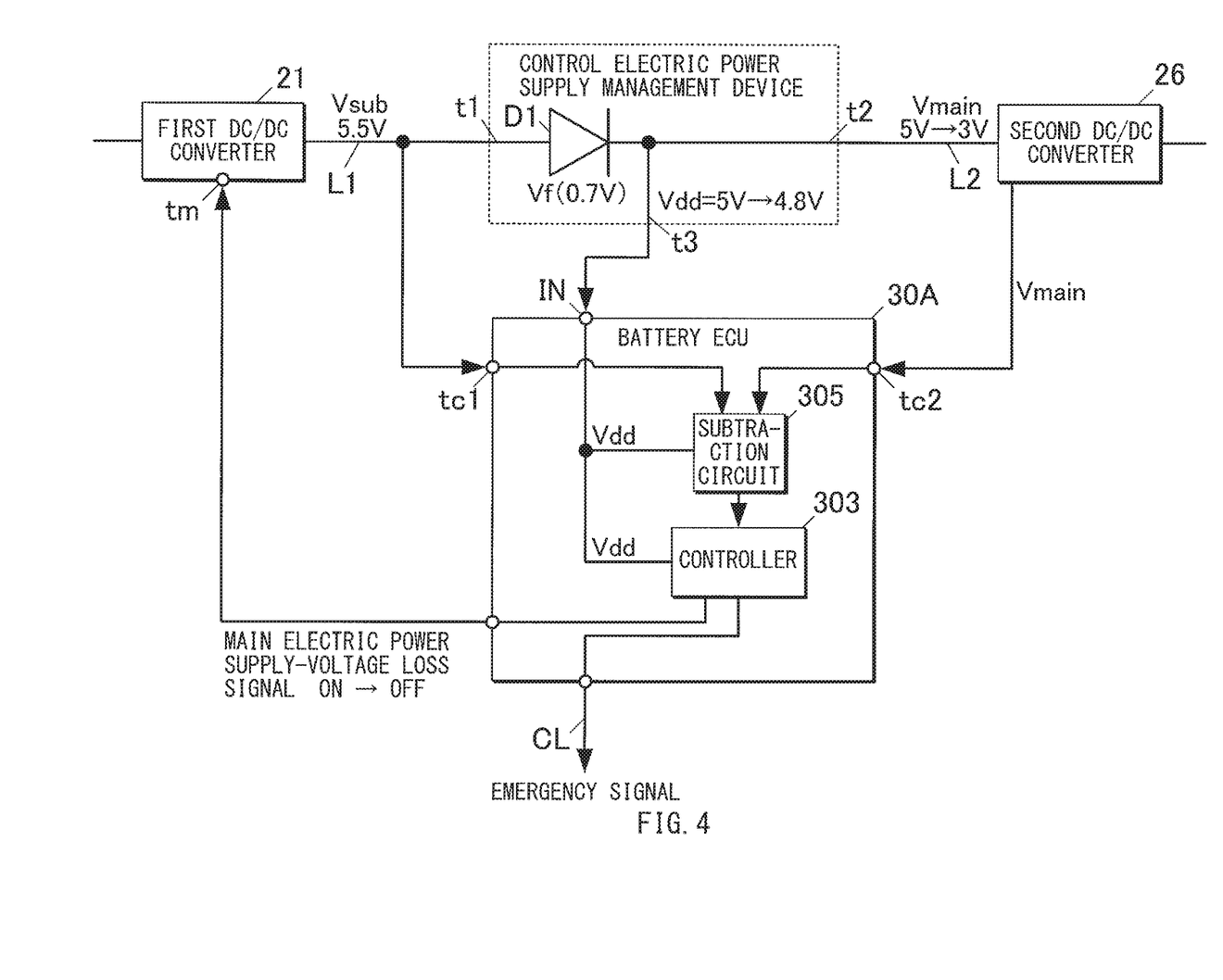
FIG. 4 is a detailed configuration diagram illustrating an example of a control electric power supply management device and its surrounding devices of modification example 1.

FIG. 4 is a detailed configuration diagram illustrating an example of a control electric power supply management device and its surrounding devices of modification example 1.

An electrical vehicle and an electric power supply system of the electrical vehicle according to modification example 1 differs from those of the example implementation of FIG. 2, in the configuration in which a voltage difference between the main electric power supply voltage Vmain and the sub electric power supply voltage Vsub is detected in a battery ECU 30A. The other devices similar to those according to an example implementation illustrated in FIG. 2 are given the same reference numerals, and such devices are not described in detail.

The battery ECU 30A of modification example 1 may include a detection terminal tc1 to which the sub electric power supply voltage Vsub is supplied and a detection terminal tc2 to which the main electric power supply voltage Vmain is supplied. The detection terminal tc2 may so receive a voltage from the interior of the second DC/DC converter 26 that a lowered main electric power supply voltage Vmain is outputted even when the main electric power supply voltage Vmain is lowered even when a voltage derived from the first electric power supply line L1 is thereby applied to the second electric power supply line L2.

The battery ECU 30A may further include a subtraction circuit 305 that calculates a voltage difference between the two detection terminals tc1 and tc2. The subtraction circuit 305 may output a subtraction result to the controller 303.

Figure 5:
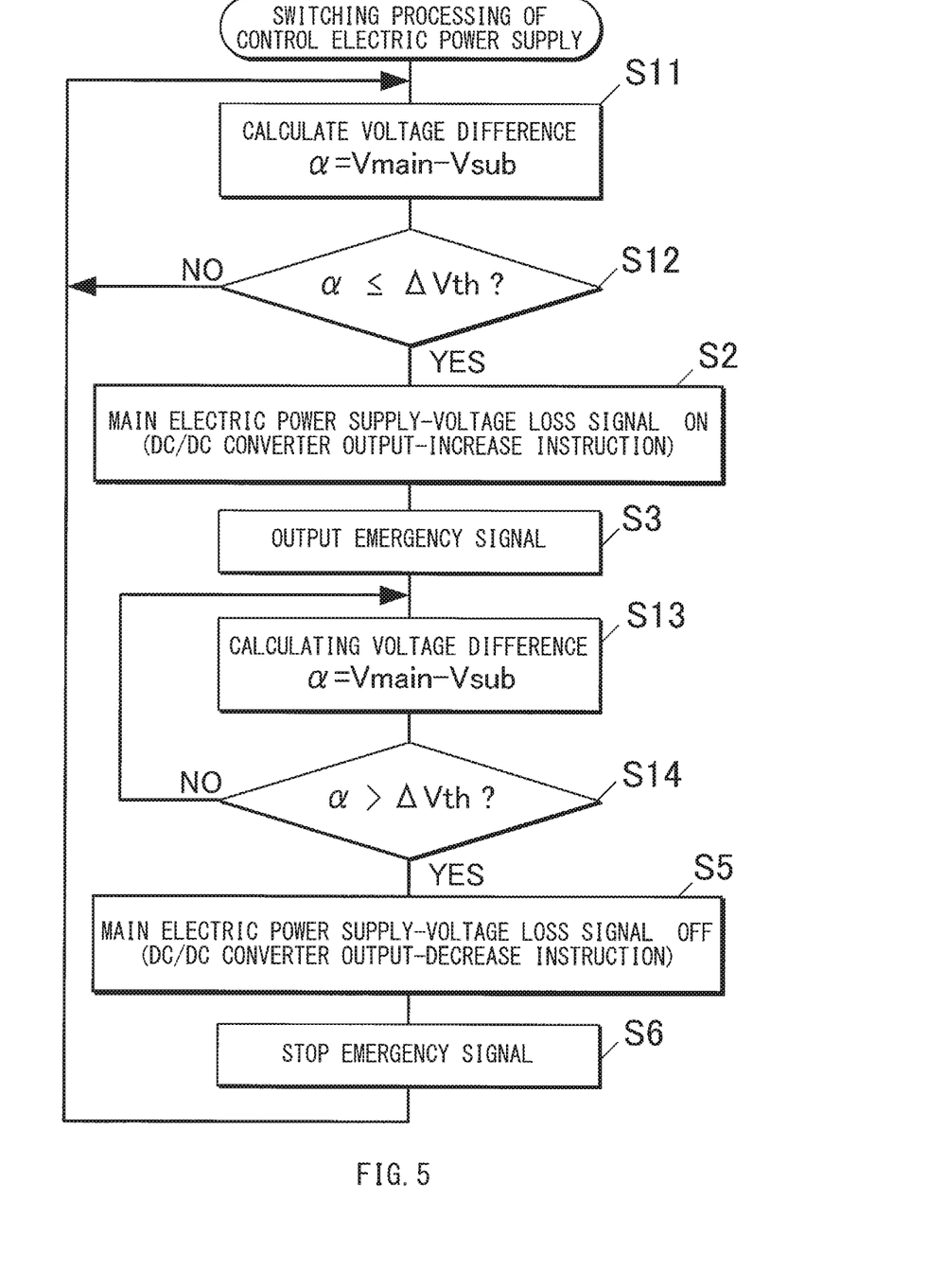
FIG. 5 is a flowchart illustrating a procedure of switching processing of control electric power supply executed by a battery ECU of modification example 1 in FIG. 4.

FIG. 5 is a flowchart illustrating an example of a procedure of switching processing of control electric power supply of the modification example 1 executed by the battery ECU 30A illustrated in FIG. 4.

During system operation, the battery ECU 30A may execute the switching processing of the control electric power supply illustrated in FIG. 5. In the switching processing of the control electric power supply, the subtraction circuit 305 may constantly calculate a voltage difference α between the main electric power supply voltage Vmain and the sub electric power supply voltage Vsub in step S11. In step S12, the controller 303 may compare the voltage difference α with a threshold ΔVth. The threshold ΔVth may be, for example, −0.6 V. In step S12, when the electric power supply performance of the low-voltage battery 25 is degraded, and thereby, the main electric power supply voltage Vmain is lowered, for example, from 5 V to 3 V, the controller 303 may determine that the voltage difference α is made smaller (YES in step S12).

Thereafter, on the basis of the determination result, the controller 303 may turn ON the main electric power supply-voltage loss signal in step S2 and output an emergency signal in step S3. The processes of step S2 and step S3 are as described in the example implementation of FIG. 3.

During the output of the emergency signal, the subtraction circuit 305 may constantly calculate the voltage difference α between the main electric power supply voltage Vmain and the sub electric power supply voltage Vsub in step S13. In step S14, the controller 303 may compare the voltage difference α with the threshold ΔVth. The threshold ΔVth may be, for example, −0.6 V. Thereafter, in step S14, when the electric power supply performance of the low-voltage battery 25 is recovered, and thereby, the electric power supply voltage Vmain is raised, for example, from 3 V to 5 V, the controller 303 may determine that the voltage difference α is made higher (YES in step S14).

Thereafter, on the basis of the determination result, the controller 303 may turn OFF the main electric power supply-voltage loss signal in step S5 and stop outputting the emergency signal in step S6. The processes of step S5 and step S6 are described in the example implementation of FIG. 3. The electric power supply system 3 may return to a state in a normal situation after the processes of steps S4 and S5, and thereby, the main electric power supply voltage Vmain may be supplied to the battery ECU 30A.

The electric power supply system of the electrical vehicle according to the modification example 1 achieves workings and effects that are similar to the example implementation illustrated in FIGS. 1 to 3.

Modification Example 2

Figure 6:
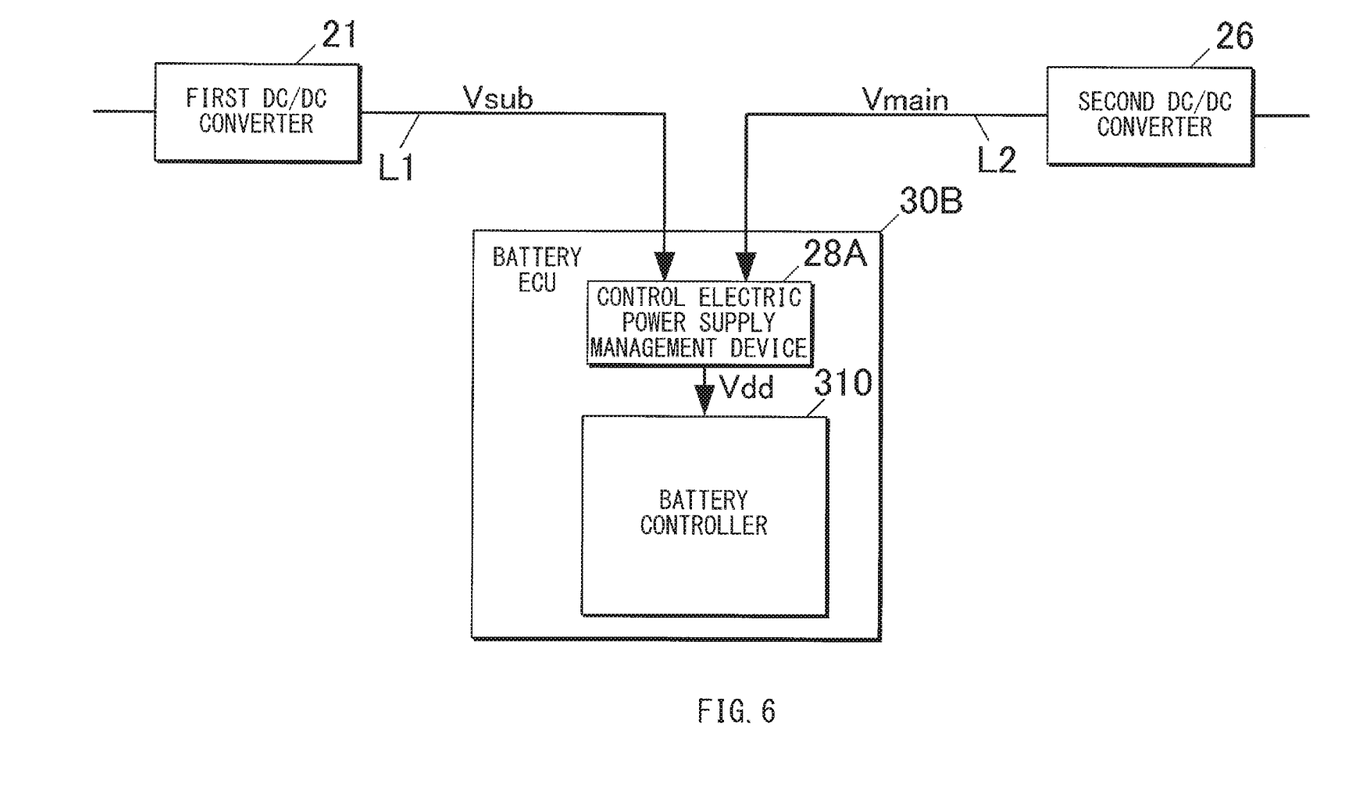
FIG. 6 is a configuration diagram illustrating a battery ECU of modification example 2.

FIG. 6 is a configuration diagram illustrating an example of a battery ECU 30B of modification example 2.

The battery ECU 30B of the modification example 2 may be a single-chip semiconductor integrated circuit. The battery ECU 30B may incorporate a control electric power supply management device 28A and a battery controller 310. The control electric power supply management device 28A may have a similar configuration to the control electric power supply management device 28 that is illustrated in the example implementation of FIG. 2 and the modification example 1 of FIG. 4. Further, the battery controller 310 may have a similar configuration to the battery ECU 30 in the example implementation of FIG. 2 or the battery ECU 30A in the modification example 1 of FIG. 4.

The electric power supply system of the electrical vehicle according to the modification example 2 as described above achieves workings and effects that are similar to an example implementation described above. In addition, according to the electric power supply system of the electrical vehicle according to the modification example 2, the control electric power supply management device 28A and the battery controller 310 may be unitized. Therefore, mounting the control electric power supply management device 28A and the battery controller 310 on a control board becomes facilitated, which makes it possible to improve reliability and reduce occupation area on the control board.

The description has been given above of the example implementations of the technology. However, the technology is not limited to the above-described example implementations. For example, a specific example for the control electric power supply management device according to an example implementation of the technology has been described in the above-described example implementations. However, any circuit configuration may be adopted for the control electric power supply management device according to an example implementation of the technology as long as the circuit configuration is able to draw an electric current from one of two voltages depending on a magnitude in voltage of the two voltages without an operation electric power supply. Further, the configuration is described in which the electric power supply voltage Vdd is outputted from the control electric power supply management device 28 to the battery ECU 30 or the battery ECU 30A, in the above-described example implementation. However, another DC/DC converter may be provided between the control electric power supply management device 28 and the battery ECU 30 or the battery ECU 30A, and thereby, an electric power supply voltage Vdd having subjected to voltage conversion by the DC/DC converter may be outputted to the battery ECU 30 or the battery ECU 30A. In this case, it is possible to improve the degree of freedom for setting a voltage value. For example, values of two electric power supply voltages that are received from the control electric power supply management device 28 may be so set as to make the difference between these voltages larger. Furthermore, in an example implementation described above, the output voltage derived from the first DC/DC converter and the output voltage derived from the second DC/DC converter are inputted to the control electric power supply management device 28. However, for example, the control electric power supply management device 28 may receive the output voltage derived from the low-voltage battery 25 and the cell voltage of the high-voltage battery 20 to thereby draw an electric current from the output voltage derived from the low-voltage battery 25 or the cell voltage of the high-voltage battery 20, depending on a difference between these voltages. Other details of any one of the foregoing implementations may be modified as appropriate without departure from the scope of the technology.

The control electric power supply management device 28 illustrated in FIGS. 1, 2, and 4, or the control electric power supply management device 28A illustrated in FIG. 6 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control electric power supply management device 28 or the control electric power supply management device 28A. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control electric power supply management device 28 illustrated in FIGS. 1, 2, and 4, or the control electric power supply management device 28A illustrated in FIG. 6.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An electric power supply system of an electrical vehicle, the electric power supply system comprising:
   a first battery configured to supply first electric power to a traveling motor;
   a battery controller configured to manage charge and discharge of the first battery;
   a second battery configured to supply second electric power having a voltage lower than a voltage of the first electric power;
   a control electric power supply management device including a joining line that is able to draw an electric current from a first electric power supply line and an electric current from a second electric power supply line, the first electric power being transmitted through the first electric power supply line, the second electric power being transmitted through the second electric power supply line, the control electric power supply management device being configured to transmit, depending on a magnitude in voltage level between a first voltage and a second voltage, one of the first electric power and the second electric power to the battery controller from one of the first electric power supply line and the second electric power supply line via the joining line, the first voltage being applied to the joining line from the first electric power supply line when the electric current is to be drawn from the first electric power supply line, the second voltage being applied to the joining line from the second electric power supply line when the electric current is to be drawn from the second electric power supply line; and
   a first DC/DC converter configured to output, to the first electric power supply line, a first output voltage that is derived from conversion of a voltage of the first battery,
   wherein the first voltage in a normal situation is lower than the second voltage in the normal situation,
   wherein the first DC/DC converter is configured to switch a load mode between a low-load mode and a high-load mode, the first DC/DC converter is able to operate with high efficiency with the low-load mode, and the first DC/DC converter is able to output a large electric current with the high-load mode, and wherein the battery controller includes:
- a detector configured to detect a lowering of the second voltage; and
- a switching processor configured to switch the load mode of the first DC/DC converter to the low-load mode when the lowering of the second voltage is not detected and to the high-load mode when the lowering of the second voltage is detected.

2. The electric power supply system of the electrical vehicle according to claim 1, wherein the control electric power supply management device is configured to perform, without using operation electric power, switching between the drawing of the electric current from the first electric power supply line and the drawing of the electric current from the second electric power supply line.

3. The electric power supply system of the electrical vehicle according to claim 1,
wherein the control electric power supply management device includes:
- a first input terminal to which the first electric power supply line is coupled;
- a second input terminal to which the second electric power supply line is coupled; and
- a diode configured to prevent the electric current from flowing back,
wherein the first input terminal is coupled to the joining line via the diode.

4. The electric power supply system of the electrical vehicle according to claim 2,
wherein the control electric power supply management device includes:
- a first input terminal to which the first electric power supply line is coupled;
- a second input terminal to which the second electric power supply line is coupled; and
- a diode configured to prevent the electric current from flowing back,
wherein the first input terminal is coupled to the joining line via the diode.

5. The electric power supply system of the electrical vehicle according to claim 3, wherein the second input terminal is directly coupled to the joining line.

6. The electric power supply system of the electrical vehicle according to claim 4, wherein the second input terminal is directly coupled to the joining line.

7. The electric power supply system of the electrical vehicle according to claim 1, further comprising a semiconductor integrated circuit that includes the battery controller and incorporates the control electric power supply management device.

8. The electric power supply system of the electrical vehicle according to claim 2, further comprising a semiconductor integrated circuit that includes the battery controller and incorporates the control electric power supply management device.

9. The electric power supply system of the electrical vehicle according to claim 3, further comprising a semiconductor integrated circuit that includes the battery controller and incorporates the control electric power supply management device.

10. The electric power supply system of the electrical vehicle according to claim 4, further comprising a semiconductor integrated circuit that includes the battery controller and incorporates the control electric power supply management device.

11. The electric power supply system of the electrical vehicle according to claim 1, further comprising:
a second DC/DC converter configured to output, to the second electric power supply line, a second output voltage that is derived from conversion of a voltage of the second battery,
wherein the second output voltage in the normal situation is set to the second voltage.

12. The electric power supply system of the electrical vehicle according to claim 2, further comprising:
a second DC/DC converter configured to output, to the second electric power supply line, a second output voltage that is derived from conversion of a voltage of the second battery,
wherein the second output voltage in the normal situation is set to the second voltage.

13. The electric power supply system of the electrical vehicle according to claim 3, further comprising:
a second DC/DC converter configured to output, to the second electric power supply line, a second output voltage that is derived from conversion of a voltage of the second battery,
wherein the second output voltage in the normal situation is set to the second voltage.

14. The electric power supply system of the electrical vehicle according to claim 4, further comprising:
a second DC/DC converter configured to output, to the second electric power supply line, a second output voltage that is derived from conversion of a voltage of the second battery,
wherein the second output voltage in the normal situation is set to the second voltage.

15. The electric power supply system of the electrical vehicle according to claim 1, wherein the detector detects the lowering of the second voltage when a third voltage is equal to or lower than a predetermined threshold, the third voltage is supplied to the battery controller from the joining line.

16. The electric power supply system of the electrical vehicle according to claim 1, wherein the detector detects the lowering of the second voltage when a difference of the second voltage and the output voltage of the first DC/DC converter is equal to or lower than a predetermined threshold.

* * * * *